United States Patent [19]
Sheets

[11] Patent Number: 5,839,802
[45] Date of Patent: Nov. 24, 1998

[54] LIGHT WEIGHT TRACK SYSTEM FOR TRACKED VEHICLE

[76] Inventor: Kerney T. Sheets, P.O. Box 771, Duplessis, La. 70728

[21] Appl. No.: 805,420

[22] Filed: Feb. 25, 1997

[51] Int. Cl.⁶ .................................................. B62D 55/08
[52] U.S. Cl. .......................... 305/52; 305/123; 305/127; 305/201; 114/270; 440/95
[58] Field of Search .................... 305/124, 126, 305/127, 185, 52, 196, 200, 201, 60, 120, 122, 123; 440/95, 96; 114/270; 180/7.1, 9.1

[56] References Cited

U.S. PATENT DOCUMENTS

| | | | |
|---|---|---|---|
| 122,850 | 1/1872 | Parvin . | |
| 1,478,321 | 12/1923 | Berkel | 305/52 X |
| 2,844,413 | 7/1958 | Gates et al. | 305/10 |
| 3,111,349 | 11/1963 | Tucker, Sr. | 305/52 X |
| 3,221,830 | 12/1965 | Walsh | 180/5 |
| 3,367,726 | 2/1968 | Tucker | 305/123 |
| 3,398,806 | 8/1968 | Hendricks | 180/2 |
| 3,576,352 | 4/1971 | Fujisawa-Skhi | 305/35 |
| 3,674,105 | 7/1972 | Egli | 180/9.48 |
| 3,754,798 | 8/1973 | Chaumont | 305/52 X |
| 4,433,634 | 2/1984 | Coast | 114/270 |
| 4,519,465 | 5/1985 | Triplett | 180/6.48 |
| 4,960,157 | 10/1990 | Sheets | 144/34 |

*Primary Examiner*—Russell D. Stormer
*Attorney, Agent, or Firm*—David L. Ray

[57] ABSTRACT

A light weight track system for a buoyant amphibious vehicle, the vehicle having two pontoons, the pontoons having a flat horizontal top surface and a flat horizontal bottom surface, each end of the flat horizontal top surface and the flat horizontal bottom surface being connected by a flat inclined surface, the track system including a plurality of treads connected by a single continuous drive chain assembly around the outside of each of the pontoons, the flat horizontal top surface and the flat horizontal bottom surface having a channel therein for rotatable receipt of the drive chain assembly, the drive chain assembly including a plurality of rotatable drive rollers connected to the treads and connected to adjacent drive rollers by links to form a continuous drive chain extending completely around the outer surface of each of the pontoons, each tread having an idler roller connected at each end thereof which contacts the surface of the pontoon to support the tread.

20 Claims, 6 Drawing Sheets

LIGHT WEIGHT TRACK SYSTEM FOR TRACKED VEHICLE

BACKGROUND OF THE INVENTION

1. Field of the Invention

The invention relates to tracked vehicles. In particular, the invention relates to track systems for amphibious tracked vehicles.

2. Description of the Related Art

Amphibious tracked vehicles are used to navigate swamps, marshes, and other wetlands to transport personnel and equipment. Such tracked vehicles can be used to transport various tools and equipment such as bush, weed, and small tree cutting equipment for clearing powerline and gas pipe line right-of-way in marshlands, swampland, and other partially flooded areas.

Amphibious tracked vehicles of the prior art are commonly heavy in weight and large in size, thereby restricting there use in swampland having trees such as cypress and tupelo gum trees spaced closely together. Furthermore, the amphibious tracked vehicles of the prior art sometimes damage the marsh and wetlands over which they are driven due to their high weight and high pressure they exert upon the ground and earth in the wetlands, marsh, and swamp.

My U.S. Pat. No. 4,960,157, which is hereby incorporated by reference, illustrates one type of tool or implement which may be carried on an amphibious tracked vehicle to cut bushes and trees in swamp, marsh, or partially flooded land.

Exemplary of the related art are the following U.S. Pat. No. 122,850; 2,844,413; 3,221,830; 3,398,806; 3,576,352; 3,674,105; and 4,519,465.

SUMMARY OF THE INVENTION

In accordance with the present invention there is provided a light weight track system for a buoyant amphibious vehicle, the vehicle having two pontoons, the pontoons having a flat horizontal top surface and a flat horizontal bottom surface, each end of the flat horizontal top surface and the flat horizontal bottom surface being connected by a flat inclined surface, the track system including a plurality of treads connected by a single continuous drive chain assembly around the outside of each of the pontoons, the flat horizontal top surface and the flat horizontal bottom surface having a channel therein for rotatable receipt of the drive chain assembly, the drive chain assembly including a plurality of rotatable drive rollers connected to the treads and connected to adjacent drive rollers by links to form a continuous drive chain extending completely around the outer surface of each of the pontoons, each tread having an idler roller connected at each end thereof which contacts the surface of the pontoon to support the tread.

DESCRIPTION OF THE PREFERRED EMBODIMENTS

Figure 1:
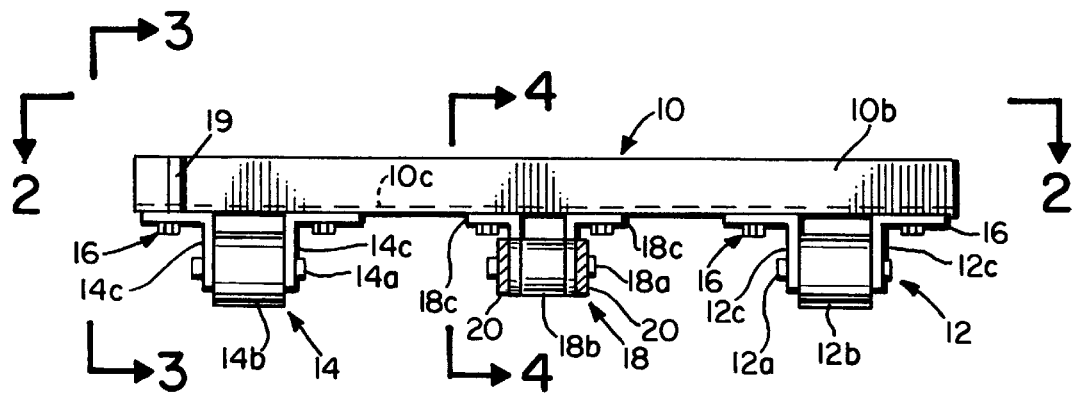
FIG. 1 is a front elevational view of a tread of the track system of the invention.
Figure 2:
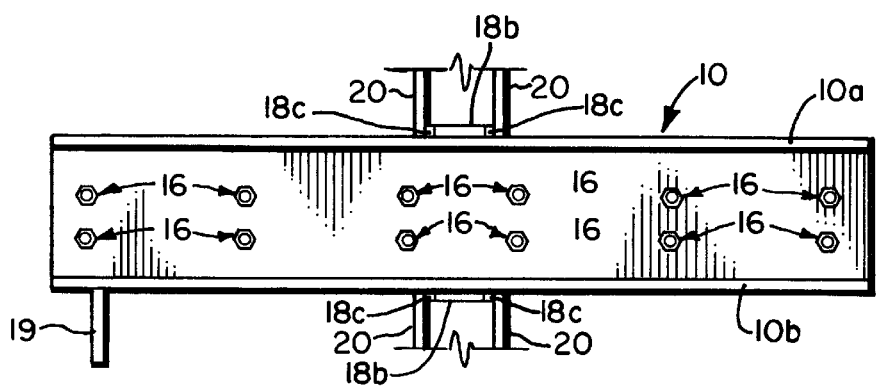
FIG. 2 is a partially cut-away plan view taken along line 2—2 of FIG. 1.
Figure 3:
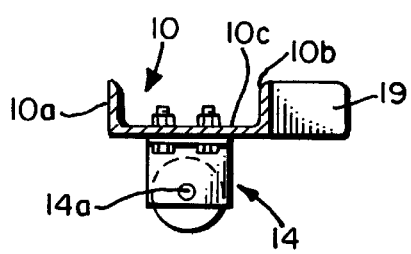
FIG. 3 is a side view taken along line 3—3 of FIG. 1.
Figure 4:
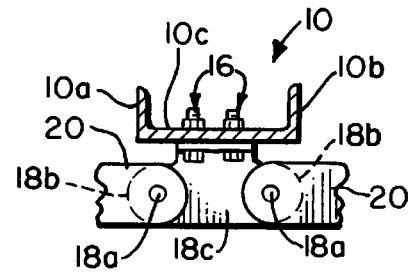
FIG. 4 is a cross-sectional view taken along lines 4—4 of FIG. 1.

Referring now to the drawings, in FIGS. 1–4 are shown one of the individual treads, generally indicated by the numeral 10, of the track system of the invention. The track system is utilized for moving a motor-driven amphibious vehicle such as the vehicle generally indicated by the numeral 11 in FIG. 5. Tread 10 can be seen to be U-shaped and includes two parallel teeth 10a and 10b rigidly connected perpendicularly to a generally rectangular tread base 10c on the outer side thereof. Teeth 10a and 10b bite into the ground or mud upon which the track is resting to provide traction for propelling vehicle 11.

Preferably tread 10 is integrally formed from a single piece of rigid material. Tread 10 can be formed from metal such as aluminum, steel, and the like. If desired, tread 10 could be formed from other rigid materials such as fiber reinforced polymeric materials, and the like. Preferably, tread 10 is constructed from an aluminum alloy to minimize the weight of each tread 10.

Connected to the bottom or inner side of rectangular tread base 10c near the outer ends thereof are two identical idler roller assemblies generally indicated by the numerals 12 and 14. Idler roller assemblies 12 and 14 each include an axle 12a and 14a having a cylindrical idler roller 12b and 14b, respectively, rotatably mounted thereon. Axles 12a and 14a are each supported by two L-shaped brackets 12c—12c and 14c—14c, respectively, which are bolted to rectangular tread base 10c by nut and bolt assemblies 16—16. Preferably idler rollers 12b and 14b are made from a rigid polymeric material such as nylon or the like to minimize weight and wear of the track assembly. If desired, idler roller 12b and 14b could be replaced with a single block of stationary or non-rotating material such as nylon which would contact the outer surface of pontoons 22—22 and slide thereover, but idler rollers 12b and 14b are preferred.

Connected to the bottom or inner side of rectangular tread base 10c near the center thereof is the drive roller assembly generally indicated by the numeral 18. Drive roller assembly 18 includes two parallel spaced apart L-shaped brackets 18c—18c bolted to each tread 10, the L-shaped brackets 18c—18c each supporting a cylindrical drive roller 18b rotatably mounted on an axle 18a. Each axle 18a—18a also has drive chain links 20—20 connected thereto on the outside of cylindrical drive rollers 18b—18b. Drive chain links 20 rotatably connect adjacent drive roller assemblies 18 connected to each of the treads 20. L-shaped brackets 18c—18c are bolted to rectangular tread base 10c by nut and bolt assemblies 16—16. Preferably each drive roller 18b is made from a rigid metal such as steel alloy to minimize wear thereon.

To prevent treads 10 from twisting around chain links 20—20 or brackets 18c—18c, or breaking or bending chain links 20—20 or brackets 18c—18c, it is important that at least one spacer member generally indicated by the numeral 19 is rigidly connected to the outer side of tooth 10b of each tread 10 adjacent to the end of tooth 10b. It is preferred that spacer member 19 is connected adjacent to the outer end of tread 10 as shown in the drawings, but spacer member 19 could be connected adjacent to the inner end of tread 10 if desired. The length of spacer member 19 is slightly less than the distance between each adjacent tread 10. Preferably, spacer 19 is welded to tread 10. When a torque or twisting force is placed on an individual tread 10, the tread 10 rotates until spacer 19 contacts an adjacent tread tooth 10a to counteract the twisting force and distribute the twisting force to adjacent treads 10. Spacer 19 prevents tread 10 from shearing off at the bolts 16—16 connecting tread 10 to brackets 18c—18c, or bending or breaking links 20—20 or brackets 18c—18c. Spacer member 19 prevents bending or breaking of chain links 20—20 or brackets 18c—18c when the treads 10 are operating in the forward or reverse direction.

Referring now to FIGS. 5–9, each of the adjacent treads 20 can be seen to be connected on the outside of two parallel rigid pontoons generally indicated by the numeral 22. Pontoons 22—22 are connected together by a rigid cross-member generally indicated by the numeral 26.

Cross-member 26 supports the superstructure generally indicated by the numeral 28. Superstructure 28 may be any desired structure such as a deck for holding the engine, controls, and occupants of vehicle 11. If desired, a cabin for protecting the engine, controls, and occupants may be part of the superstructure. The superstructure may also include an open deck or bed for storing various items being transported by the vehicle 11 to various desired locations.

Pontoons 22—22 are hollow inside, air tight, and are selected of sufficient size to make the entire vehicle 11 upon which the track system of the invention buoyant. The size of the pontoons may be selected to provide the desired amount of buoyancy to control the level at which vehicle 11 will float in water.

Pontoons 22—22 each have an outside vertical wall 22a and an inside vertical wall 22b. Pontoons 22—22 each have a flat horizontal top surface 30 and a flat horizontal bottom surface 31 connected by two flat inclined surfaces 22g. The flat horizontal bottom surface 31 normally rests upon the ground or mud bottom in the wetlands in which vehicle 11 is used, unless the water above the bottom is sufficiently high to cause the vehicle 11 to float.

Extending around the center of the horizontal top surface 30 and the center of the horizontal bottom surface 31 of each pontoon 22 is a U-shaped channel generally indicated by the numeral 32 which receives cylindrical drive rollers 18b and holds drive rollers 18b therein. As can best be seen in FIGS. 5, 8, and 9, channel 32 has a flat bottom 32a rigidly connected to the top surface 30 or bottom surface 31 of pontoon 22, and two vertically extending side walls 32b—32b which are perpendicular to bottom 32a. Sidewalls 32b—32b preferably extend above the axle 18a. Sidewalls 32b—32b prevent drive rollers 18b from sliding out of channel 32. Preferably, channel 32 is located in the approximate center of the width of the top surface 30 and bottom surface 31 of each pontoon 22.

Figure 5:
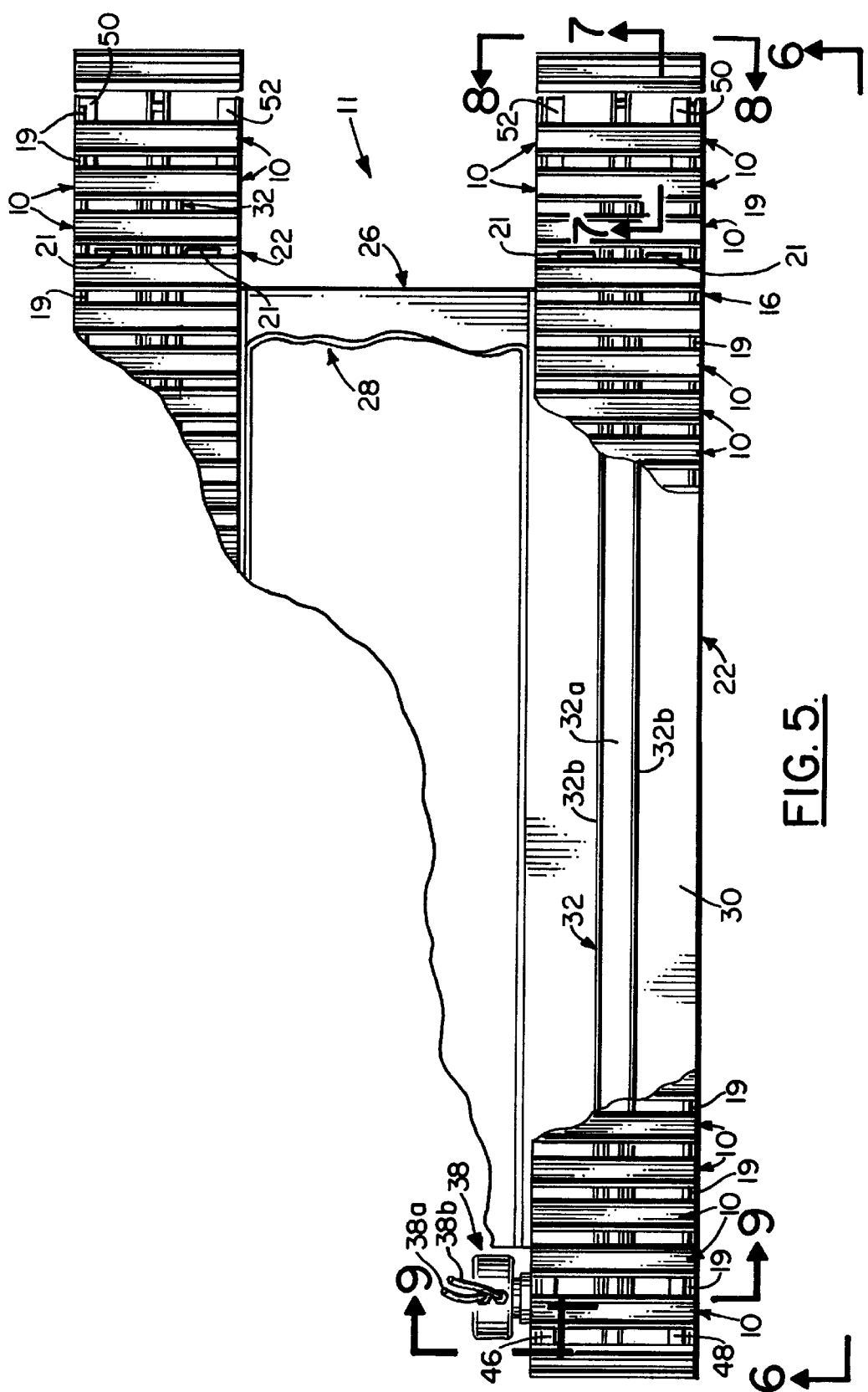
FIG. 5 is a partly cut-away top view of the track system of the invention mounted on two pontoons.
Figure 10:
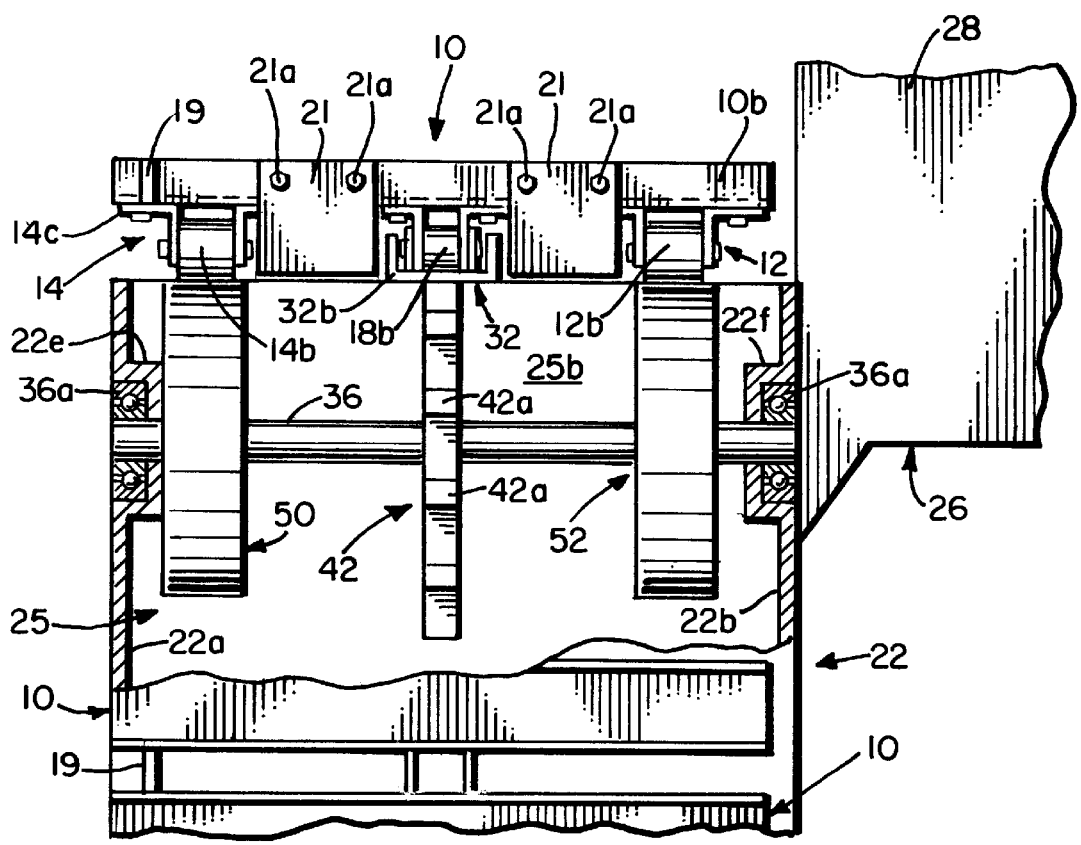
FIG. 10 is a front elevational view, partly cut-away, of the front of a pontoon when a tread having wipers thereon is aligned with the front of the pontoon.

It is important that at least one tread 10 on each pontoon 22—22 has rectangular wipers 21—21 connected to tooth 10b as shown in FIGS. 5 and 10 by bolts or screws 21a. Wipers 21—21 continuously wipe mud and other debris from the top surface 30 of pontoons 22—22 to prevent mud and debris accumulation on pontoons 22—22. Such mud and debris accumulation on the top surface 30 of pontoons 22—22 place an unwanted load on vehicle 11 which could sink vehicle 11. Wipers 21—21 are preferably made from a heavy flexible woven or fibrous material such as the material used in making heavy flat drive belts used on large machinery. Preferably, wipers 21—21 extend downward from tooth 10b to a point near the top surface 30 of pontoons 22—22, and are located between channel 32 and idler rollers 12b and 14b. Wipers 21—21 are preferably rectangular in shape and have a width which extends from a point closely adjacent to idler rollers 12b and 14b to a point closely adjacent to drive roller 18b as shown in FIG. 10. If desired, wipers 21 could be added to more than one tread 10.

Figure 6:
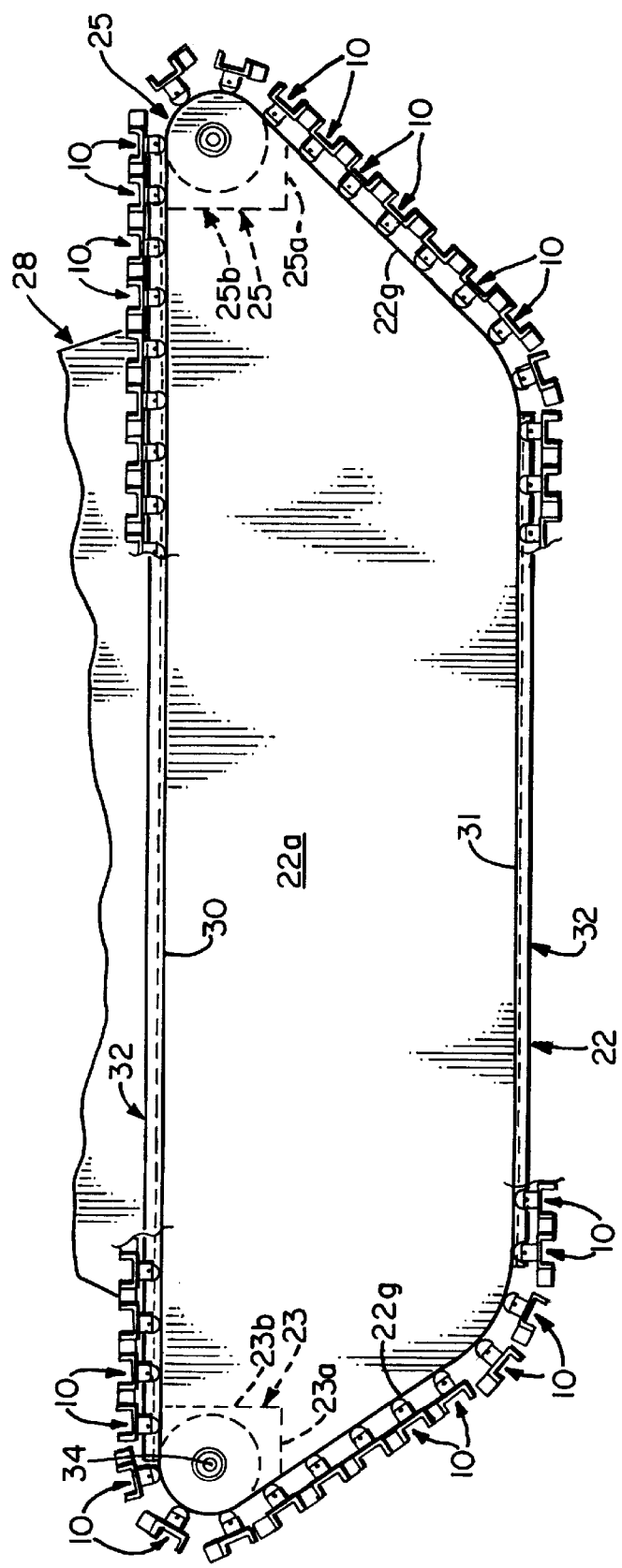
FIG. 6 is a partly cut-away schematic elevational view taken along line 6—6 of FIG. 5.
Figure 7:
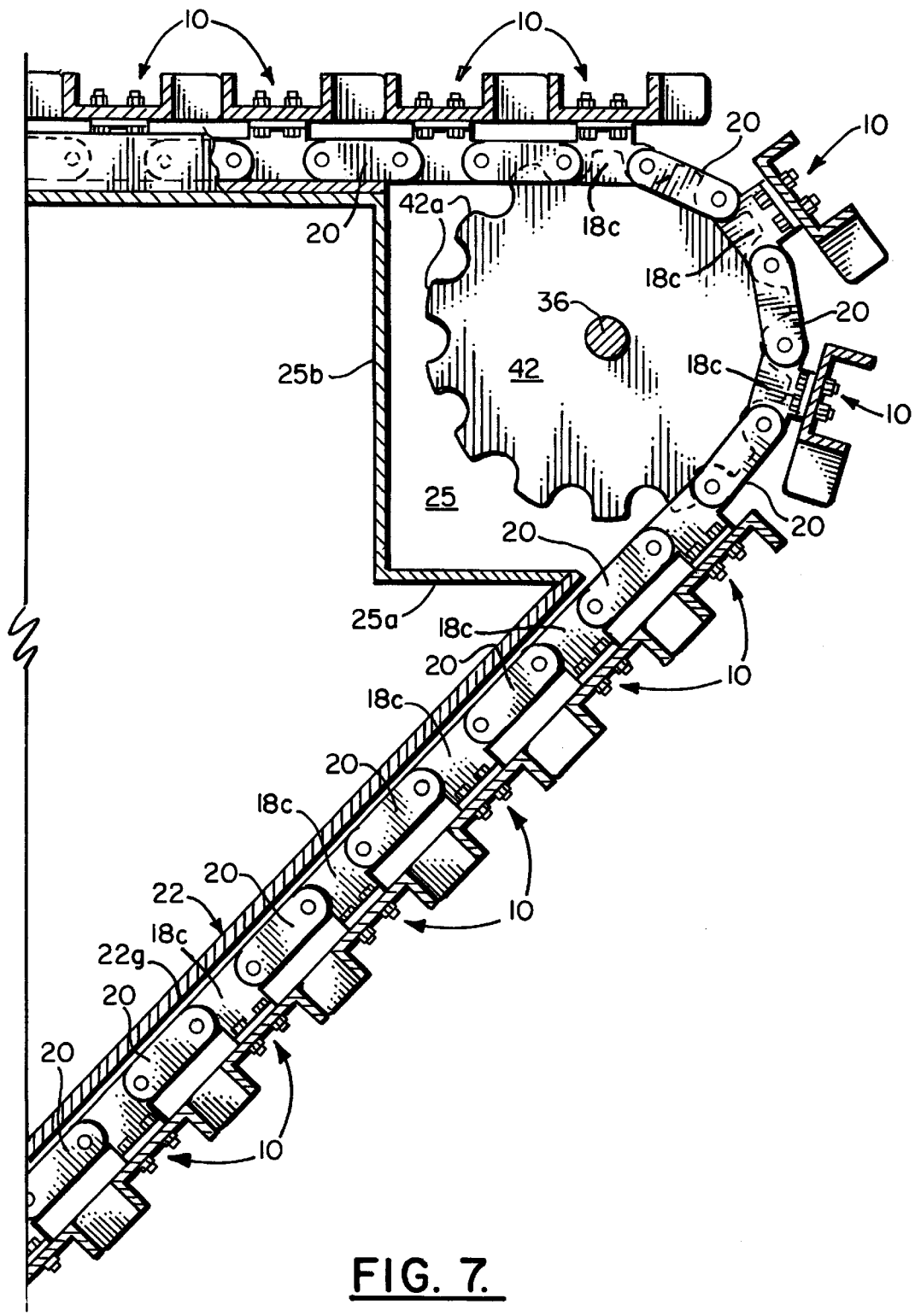
FIG. 7 is a cross-sectional view taken along lines 7—7 of FIG. 5.
Figure 8:
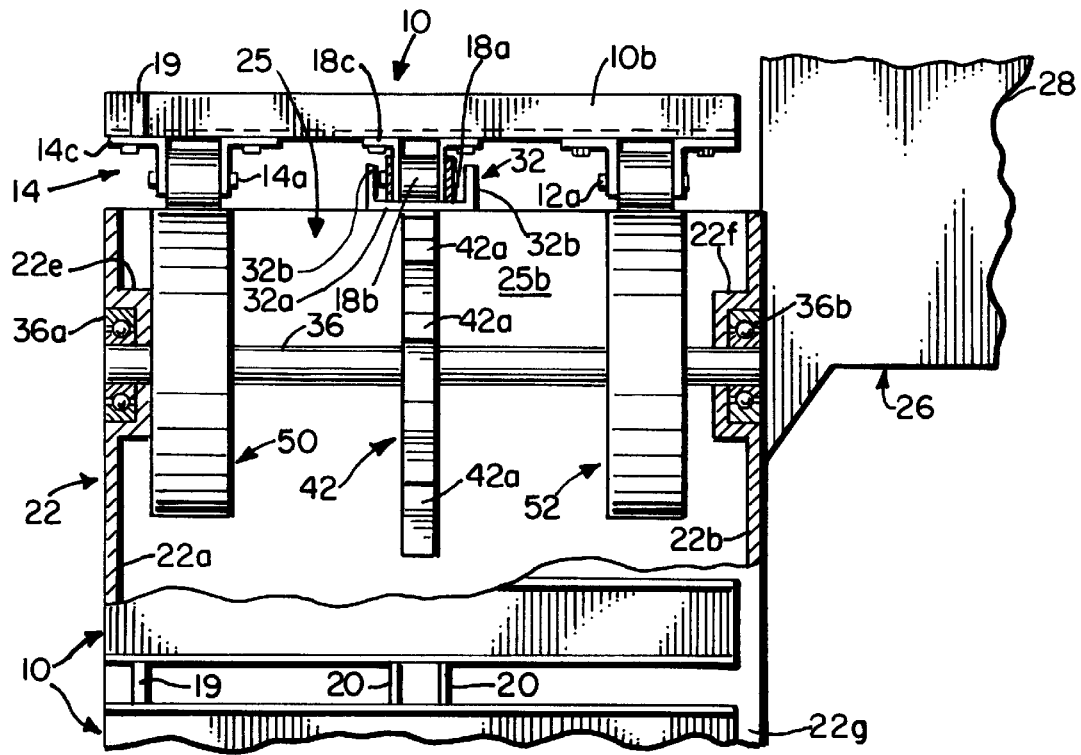
FIG. 8 is a elevational view, partly cut-away, taken along line 6—6 of FIG. 5.
Figure 9:
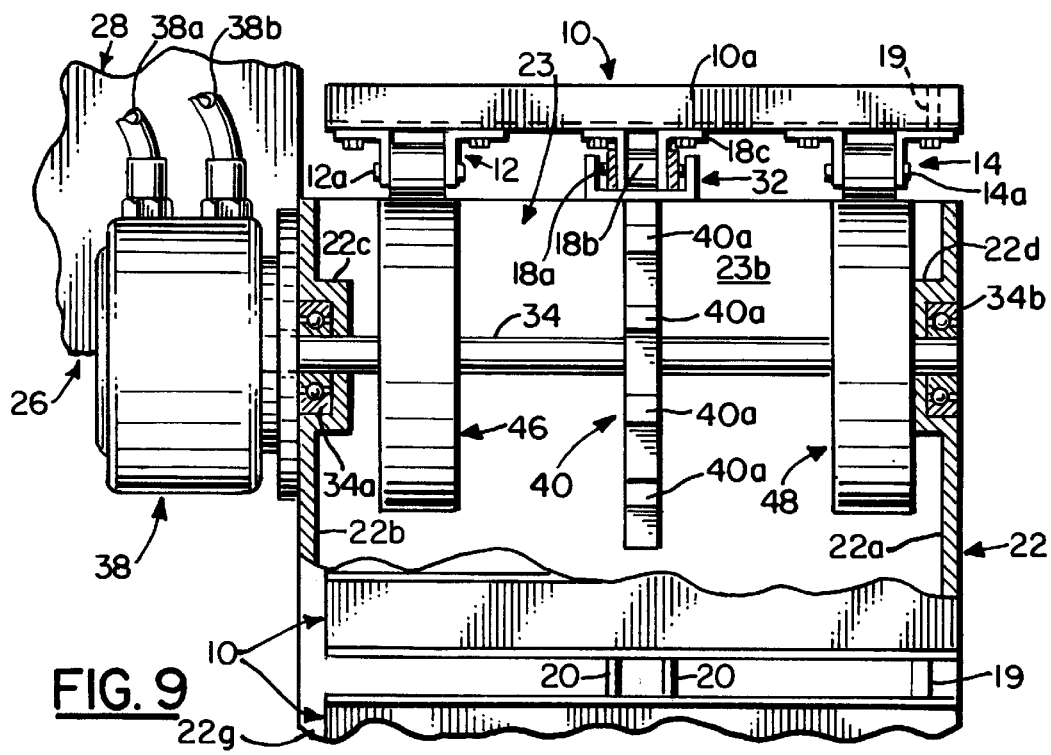
FIG. 9 is a elevational view, partly cut-away, taken along line 9—9 of FIG. 5.

As can be seen in FIGS. 6, 7, and 9, each pontoon 22—22 has a gear chamber on the upper portion of each end thereof generally indicated by the numerals 23 and 25. Gear chamber 23 has a rectangular horizontal bottom wall 23a, a rectangular vertical back wall 23b, and two side walls formed by the extension of the side walls 22a and 22b of pontoons 22—22. Gear chamber 25 has a rectangular horizontal bottom wall 25a, a rectangular vertical back wall 25b, and two side walls formed by the extension of the side walls 22a and 22b of pontoons 22—22. If desired, both gear chambers 23 and 25 could have the rectangular vertical back walls 23b and 25b, and the horizontal bottom walls 23a and 25a, replaced with one curved wall which would closely conform and extend close to the surface of the sprockets 40 and 42 to prevent mud from accumulating at the intersection of the horizontal bottom walls and vertical backwalls. Preferably gear chamber 23 is located at the rear of pontoons 22—22, and gear chamber 25 is located at the front of pontoons 22—22.

Located inside gear chamber 23 is drive axle 34, and located inside chamber 25 is idler axle 36. As shown in FIG. 9, the two ends of drive axle 34 are rotatably received in bearings 34a and 34b which are located in bearing housings 22c and 22d, respectively, and the two ends of idler axle 36 are rotatably received in bearings 36a and 36b which are located in bearing housings 22e and 22f, respectively. Bearing housings 22c—22c are located on the inside of the extension of pontoon wall 22b—22b into gear chamber 23, and bearing housings 22d—22d are located on the inside of the extension of pontoon wall 22a into gear chamber 23. Bearing housings 22f—22f are located on the inside of the extension of pontoon wall 22b into gear chamber 25, and bearing housings 22e—22e are located on the inside of the extension of pontoon wall 22a into gear chamber 25.

Each of the drive axles 34 extend through bearing 34a to a motor 38 connected to each drive axle 34 which individually turn drive axles 34 to drive each of the track assemblies on each of the pontoons 22—22. Motor 38 is preferably a hydraulically operated motor well known in the art. Motor 38 is supplied with hydraulic drive fluids to drive motor 38 through lines 38a and 38b supplied by a conventional pump (not shown) and engine (not shown) mounted on cross-member 26 or superstructure 28. If desired, a conventional gear drive could be used to individually drive the track assembly on each pontoon 22—22.

Rigidly connected to the center of drive axle 34 is drive sprocket 40 having teeth 40a thereon, and rigidly connected to the center of idler axle 36 is idler sprocket 42 having teeth 42a thereon. Motor 38 turns axle 34, causing drive sprocket 40 to contact drive rollers 18b and force them in the direction in which the teeth 40a contacting the drive roller is moving. Idler sprocket 42 is contacted by drive rollers 18b, and the teeth 42a contacted by drive rollers 18b are forced to turn in the direction in which drive rollers 18b roller are moving.

Rigidly connected to drive axle 34 on each side of sprocket 40 are the roller support drums generally indicated by the numerals 46 and 48. Roller support drums 46 and 48 rotate with axle 34. Roller support drums 46 and 48 contact rollers 12*b* and 14*b*, respectively. Rollers 12*b* and 14*b* follow roller support drums 46 and 48 partially therearound and to the top horizontal surface of pontoon 22, assuming idler drums 46 and 48 are turning clockwise in the view shown in FIG. 6.

Rigidly connected to axle 36 on each side of sprocket 42 are the rigid metal cylindrical roller support drums generally indicated by the numerals 50 and 52. Roller support drums 50 and 52 rotate with axle 36. Roller support drums 50 and 52 contact rollers 14*b* and 12*b*, respectively. Rollers 14*b* and 12*b* follow roller support drums 50 and 52 partially therearound and to the inclined surface of pontoon 22, assuming idler drums 50 and 52 are turning clockwise in the view shown in FIG. 6.

By using a single drive sprocket 40 to drive a single line of drive rollers 18*b*, the weight of the track assembly of the invention is reduced. Weight reduction is achieved because only a single line of heavy steel drive rollers 18*b*, steel links 20, steel brackets 18*c*, and steel channel 32 is needed. As will be obvious to those skilled in the art, it is necessary that the drive rollers 18*b*, links 20, brackets 18*c*, and channel 32 be constructed of steel to achieve an economically useful life of these parts due to the stress placed thereon.

When the bottom surface 31 of each of the pontoons 22—22 is in contact with the ground in the wetlands in which the vehicle 11 is used, the track assembly propels the vehicle 11 over the ground by the treads 10 and teeth 10*a* and 10*b* contacting and biting into the ground as the track assembly rotates around each of the pontoons 22—22. When the bottom surface 31 of each of the pontoons 22—22 is not in contact with the ground in the wetlands in which the vehicle 11 is used and the vehicle 11 is floating, the track assembly propels the vehicle 11 through the water by the rotating treads 10 and teeth 10*a* and 10*b* contacting and paddling through the water as the track assembly rotates around each of the pontoons 22—22. The speed and direction of rotation of each track assembly can be controlled individually to steer and turn the vehicle 11 on the ground or in the water.

The spacer member 19 and the wipers 21—21 are very important in enabling an amphibious tracked vehicle to function with a single drive sprocket and drive chain assembly. Utilizing a single drive sprocket and drive chain assembly greatly reduces the weight of the vehicle. Typical drive chain assemblies weigh as much as 500 pounds per drive chain, and many employ two such drive chains per track. By utilizing the spacer member 19, the wipers 21—21, and the other features of the invention, the light weight track assembly of the invention employing a single drive chain may be utilized under harsh conditions to reduce the weight of the track system and the total weight of an amphibious tracked vehicle. Furthermore, the track system of the invention prevents mud and debris from accumulating on the vehicle and adding weight to the vehicle.

Although the preferred embodiments of the invention have been described in detail above, it should be understood that the invention is in no sense limited thereby, and its scope is to be determined by that of the following claims:

What is claimed is:

1. A light weight track system for use on a buoyant amphibious vehicle, the vehicle having a superstructure supported by two pontoons, the pontoons having an outer surface including a flat horizontal top surface and a flat horizontal bottom surface and two flat inclined surfaces connecting each end of said flat horizontal top surface to each end of said flat horizontal bottom surface, said track system comprising:

a. a plurality of two-ended treads connected by a single continuous drive chain assembly around said outer surface of each of said pontoons, said drive chain assembly comprising a plurality of rotatable drive rollers, each of said drive rollers being rotatably connected to the approximate center of each of said treads and to adjacent drive rollers by rigid chain links to form a continuous drive chain extending completely around the outer surface of each of said pontoons, each tread having an idler roller rotatably connected thereto adjacent to each end thereof, which idler roller contacts said surface of said pontoon to support said tread, each of said treads having a spacer member connected thereto which extends from said tread to a point closely adjacent to an adjacent tread, and b. a channel connected to said flat horizontal top surface and said flat horizontal bottom surface of each of said pontoons for receipt of said drive rollers, at least one of said treads on each of said pontoons having a wiper connected thereto which extends downward from said tread on each side of said channel to a point closely adjacent to said top surface of said pontoon.

2. The track system of claim 1 wherein said channel is U-shaped.

3. The track system of claim 2 wherein said channel has a flat bottom rigidly connected to said flat horizontal top surface and said flat horizontal bottom surface.

4. The track system of claim 3 wherein said channel has two vertically extending side walls which are perpendicular to said flat bottom of said channel.

5. The track system of claim 3 wherein said channel is located in the approximate center of the width of said flat horizontal top surface and said flat horizontal bottom surface.

6. The track system of claim 1 wherein each of said treads have two parallel teeth rigidly connected perpendicularly to a tread base on the outer side thereof.

7. The track system of claim 6 wherein said spacer member is connected to outer side one of said two parallel teeth.

8. The track system of claim 7 wherein said tread base is generally rectangular in shape.

9. The track system of claim 8 wherein each of said teeth are generally rectangular in shape.

10. The track system of claim 9 wherein each of said drive rollers is connected to each adjacent drive roller by two metal chain links located on each side of said drive roller.

11. The track system of claim 1 wherein each of said idler rollers is connected on opposite sides of said drive roller adjacent to the ends of said tread.

12. The track system of claim 1 wherein a drive sprocket is located on each of said pontoons for driving said continuous drive chain.

13. The track system of claim 12 wherein said drive sprocket is located at one end of each of said pontoons.

14. The track system of claim 13 wherein said drive sprocket is mounted on an axle, and two cylindrical support drums are located on each side of said axle for contacting said idler rollers.

15. The track system of claim 14 wherein an idler sprocket is located on each of said pontoons for driving said continuous drive chain.

16. The track system of claim 15 wherein said idler sprocket is located at one end of each of said pontoons.

17. The track system of claim 16 wherein said idler sprocket is mounted on an axle, and two cylindrical support drums are located on each side of said axle for contacting said idler rollers.

18. The track system of claim 1 wherein said wiper is generally rectangular in shape.

19. The track system of claim 1 wherein said wiper is constructed from a flexible material.

20. A light weight track system for use on a buoyant amphibious vehicle, the vehicle having a superstructure supported by two pontoons, the pontoons having an outer surface including a flat horizontal top surface and a flat horizontal bottom surface and two flat inclined surfaces connecting each end of said flat horizontal top surface to each end of said flat horizontal bottom surface, said track system comprising:

a. a plurality of two-ended treads connected by a single continuous drive chain assembly around said outer surface of each of said pontoons, said drive chain assembly comprising a plurality of rotatable drive rollers, each of said drive rollers being rotatably connected to the approximate center of each of said treads and to adjacent drive rollers by rigid chain links to form a continuous drive chain extending completely around the outer surface of each of said pontoons, each tread having an idler roller rotatably connected thereto adjacent to each end thereof which drive roller contacts said surface of said pontoon to support said tread, each of said treads having a spacer member connected thereto which extends from said tread to a point closely adjacent to an adjacent tread, b. a channel connected to said flat horizontal top surface and said flat horizontal bottom surface of each of said pontoons for receipt of said drive rollers, at least one of said treads on each of said pontoons having a flexible wiper connected thereto which extends downward from said tread on each side of said channel to a point closely adjacent to said top surface of said pontoon, c. a sprocket mounted on an axle connected to each of said pontoons for driving said continuous drive chain, d. two cylindrical support drums located on each side of said axle for contacting said idler rollers, and e. a motor connected to said superstructure and to said axle for rotating said axle.

\* \* \* \* \*